United States Patent [19]

Price et al.

[11] Patent Number: 5,476,116

[45] Date of Patent: Dec. 19, 1995

[54] FLOATING ADJUSTABLE POOL CHLORINATOR

[75] Inventors: Kenneth E. Price, Whittier; Michael L. Schuman, El Monte, both of Calif.

[73] Assignee: Rainbow Lifegard Products, Inc., El Monte, Calif.

[21] Appl. No.: 324,891

[22] Filed: Oct. 18, 1994

[51] Int. Cl.$^6$ ................................................. B01D 12/00
[52] U.S. Cl. ................. 137/268; 422/119; 422/264; 422/265; 422/279; 239/59; 239/310; 222/48
[58] Field of Search ................. 137/268; 422/265, 422/119, 264, 266, 269, 273, 279, 278; 239/310, 315, 58, 59; 222/48, 549, 553

[56] References Cited

U.S. PATENT DOCUMENTS

| | | | |
|---|---|---|---|
| 4,763,685 | 8/1988 | King, Sr. ......................... | 137/268 |
| 4,798,707 | 1/1989 | Thomas et al. ................... | 422/265 X |
| 4,822,571 | 4/1989 | Nicholson et al. ............... | 137/268 X |
| 4,917,868 | 4/1990 | Alexander et al. ............... | 137/268 X |
| 5,064,624 | 11/1991 | King ................................. | 422/264 |

*Primary Examiner*—Martin P. Schwadron
*Assistant Examiner*—Kevin L. Lee
*Attorney, Agent, or Firm*—Christie, Parker & Hale

[57] ABSTRACT

A dispensing device comprises a body having a chamber sized to accommodate a volume of solid halogen source therein. The chamber comprises an open end and a closed end. A number of apertures extend through the body and into the chamber near the closed end. A control member comprises an open end and a closed end separated by a wall. The open end of the control member is rotatably mounted over the closed end of the chamber. Openings extend through the wall and are positioned at locations that correspond to the apertures so that alignment of the openings with respective apertures form dispensement ports. The ports has a degree of closure that can be precisely controlled by rotation of the control member about the body for dispensing the halogen solution to the water. A cap is releasably attached to the open end of the chamber to form an air and water-tight seal therebetween, creating an air head within the body when placed into the water. The air head controls the amount of solid halogen source wetted to that portion adjacent the apertures. Water is circulated through the apertures to wet the solid source and generate halogen solution. Controlled solid source wetting and variable adjustment of the dispensement ports permits halogen solution to be dispensed to the water in a precisely controlled manner.

20 Claims, 4 Drawing Sheets

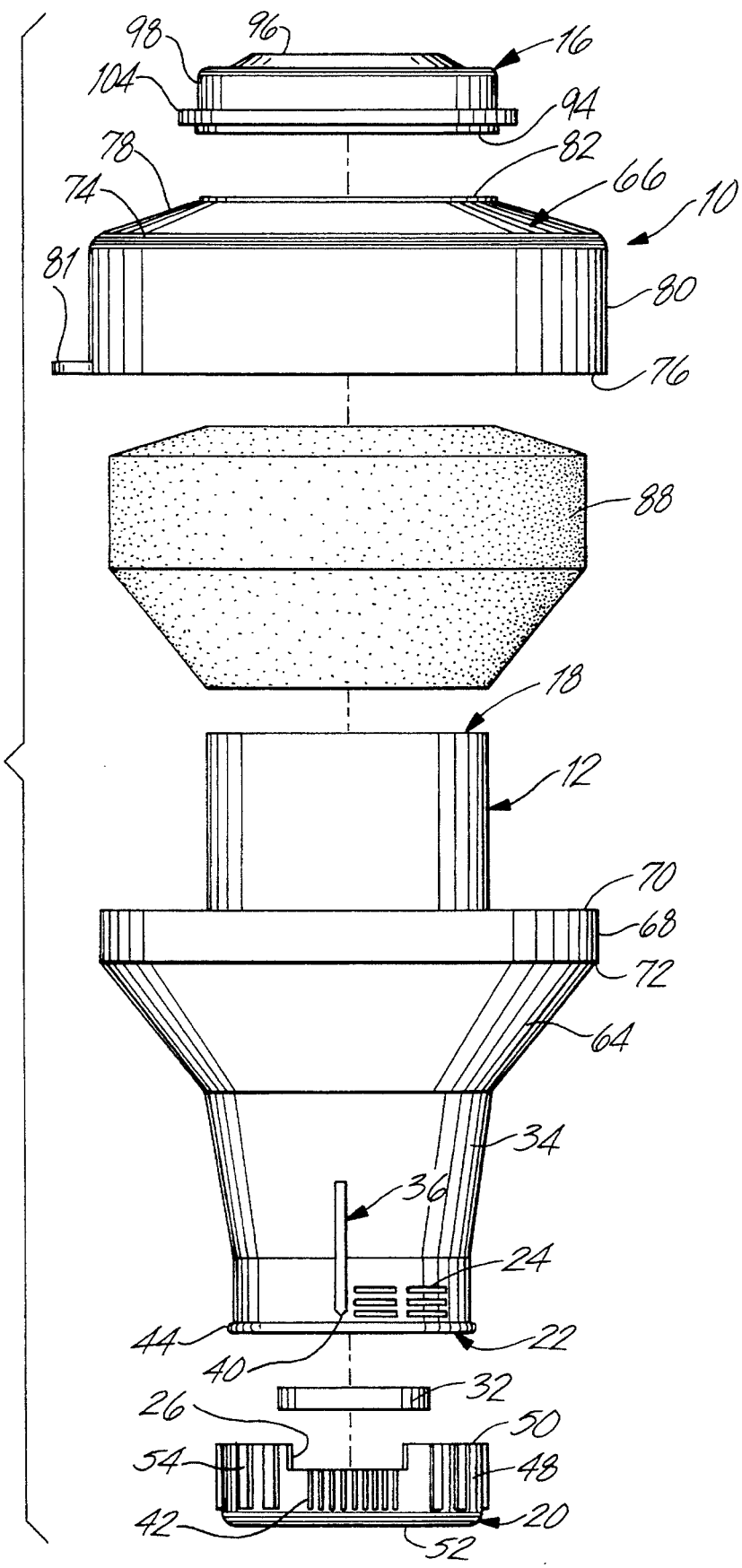

FLOATING ADJUSTABLE POOL CHLORINATOR

FIELD OF THE INVENTION

This invention relates to a device for dispensing a halogen solution, formed from a solid water-soluble halogen source such as chlorine and the like, in a spa, hot tub or swimming pool.

BACKGROUND OF THE INVENTION

Unless controlled, the water in swimming pools, spas, hot tubs, and the like can become contaminated with algae and similar organisms. The contaminant growth is usually controlled by the addition of a suitable biocide to the water. Typically, the biocide is a halogen derived from solution of a halogen salt; most commonly the halogen salt is a source of chlorine. The amount of chlorine required to maintain the water in a substantially organism-free state depends on the size of the pool or spa, the climatic conditions, the temperature of the water, and the extent of use of the pool or spa. The hot water found in spas and hot tubs necessitates the frequent addition of chlorine, because the material added rapidly loses effectiveness. A device that can be placed in the water to dispense chlorine in controlled amounts relieves the spa or pool owner or operator of the necessity of regularly monitoring and maintaining the chlorine content of the water.

Chlorine dispensing devices exist for swimming pools. One such device, among many, is the Rainbow Plastics Model 330 floating dispenser for solid chlorine. This dispenser resembles an inverted hollow truncated cone. The interior serves as a receptacle into which granular pellets of water-soluble chlorine source material are placed. Around the circumference of the receptacle adjacent to the bottom there are apertures consisting of elongated vertical slots. The slots cooperate with a similarly slotted sleeve which is captive to and rotatable about the exterior of the container. The sleeve can be adjusted so that the slots are fully closed, fully opened, or in between. The top of the receptacle is closable by a lid which does not make an air-tight seal with the receptacle. The walls of the container are hollow and are filled with closed-cell plastic foam. The cavity in which the foam is located is hermetically sealed. The dispenser does not incorporate any ballast elements.

When filled with a soluble solid source of chlorine or other desired halogen ion source and floated in a swimming pool, the pool water enters into the receptacle and fills it to the level at which the dispenser is floating. The water in the receptacle wets at least that source material which lies below the floating waterline of the dispenser. Accordingly, the wetted source material in the receptacle is dissolved thereby releasing the active constituent of the material into the water in the dispenser. The rate at which such solution is released to the adjacent pool or spa is regulated by the extent to which the apertures in the receptacle are opened or closed by the position of the adjustment sleeve on the exterior of the receptacle. However, this dispenser is not conveniently usable in the comparatively small water volume in a spa because the effective size of the apertures of the dispenser cannot be regulated precisely enough to prevent the dispenser from over-chlorinating the spa water which, by reason of its temperature, acts more rapidly on the source material than the usually cooler water in a swimming pool. Also, this dispenser has a relatively large capacity for containing the source material so that, even when its apertures are very nearly closed, substantial quantities of source material are wetted, dissolved and released from the dispenser.

Another chlorine dispensing device for dispensing a soluble solid source of chlorine i.e., for spas and hot tubs is disclosed in U.S. Pat. No. 4,630,634. Rainbow Plastics Model 335 floating dispenser conforms to the disclosure of that patent. That dispenser comprises a tubular body having a hollow pancake-shaped float at a closed upper end of the body and a tubular-shaped sleeve that fits over the opposite open end of the body. The body accommodates a predetermined volume of soluble solid halogen source material, of which a preselected amount is exposed to contact with the water via a plurality of elongated slots or apertures positioned at diametrically opposite locations in the sleeve. The body and sleeve are threadably engagable with one another to form the assembled dispensing device and are placed in the water in a vertically oriented position with the apertures immersed. The pancake-shaped float at the physical top of the body and a lead weight at the bottom of the sleeve ensures that the dispenser floats vertically erect.

The extent of the solid source material that is wetted is controlled by the axial position of the sleeve on the body. That axial position of the sleeve on the body determines the effective area of the vertical slots in the sleeve which afford communication from the bottom of a chamber in the body and sleeve and in which the source material is contained. Only that portion of the source material that lies below the open end of the body and into the sleeve is exposed to the water to form a biocidal solution. The rate that the solution is dispensed to the water outside the dispenser is controlled by the degree of closure of the apertures. The source material in the chamber above the lower end of the body is dry in the chamber because it lies within an air bubble which is trapped in the interior of the body.

It has been discovered that, in some applications, this latter dispenser does not afford sufficient control over the dispensation rate of the solution from the dispenser. The relatively large openings in the dispenser sleeve can permit the passage of solid chlorine granules from the device to the water where such a highly concentrated oxidizing source can discolor adjacent pool or spa surfaces.

Additionally, once the solid halogen source is completely dissolved, the latter dispenser must be reloaded by disassembling the sleeve from the body and loading the new source material into the body. The need to disassemble the dispenser when reloading it can result in loss of the desired operating position adjustment of the sleeve on the body. An advantage of that latter dispenser over the former one is that, in the latter dispenser, only a small controllable position of the source material is wetted when the filled dispenser is placed into a pool or spa.

Other available products include cumbersome floating structures, which receive a non-refillable disposable replaceable cartridge that contains the soluble source of chlorine or other halogen. The exterior of the cartridge contains ribs which cooperate with slots in a large float to hold the cartridge in a selected position vertically relative to the float. The containers are molded with bumps axially spaced along the container adjacent to the bottom end and a single bump adjacent to the top end. The user cuts off one or more bottom bumps to define the extent to which water communicates with the inside of the container, and cuts off the top bump to provide air communication to the inside of the container. The container is then placed into the large float and the resulting assembly is placed in the pool. Water then fills the cartridge to the water line of the floating assembly; the vertical position of the cartridge in the float determines the extent to which the cartridge contents are wetted.

There are several practical difficulties with these last products. They are quite large and so do not fit well into a spa or hot tub. Their size makes them cumbersome to remove from the spa when the spa is to be used. They are aesthetically unappealing. They cannot reliably be adjusted to provide the precise solution rates needed for efficient chlorination (halogenation) of spas and hot tubs because of the crude and imprecise manner in which communication of water to the interior of the cartridge is provided. They are essentially floating packages of halogen source material designed by major source material manufacturers whose purpose is to market source material; the user cannot change source material without changing the entire dispenser; the user cannot use any source material he wishes.

In a dispenser for spas, it is important that the rate of solution of the source material be controllable with meaningful precision over a range commensurate with the lower chlorination requirements of spas, as compared to swimming pools. It is therefore desirable that a dispensing device afford good control over the rate at which a concentrated biocidal solution is created within the dispenser and over the rate at which that solution is dispensed to the exterior of the device. It is desirable that the dispensing device not be too bulky and not create an obstruction in the spa, and be aesthetically pleasing. The dispensing device should be constructed in a manner facilitating source material reloading without having to disassemble the device or disturb the adjustment for controlling the rate of solution dispensation from the interior of the device. The dispensing device should enable the user to select, as he chooses, from among many commercially available source materials. Finally, the dispensing device should be made of a material resistant to damage from prolonged exposure to sunlight and chemicals.

SUMMARY OF THE INVENTION

This invention addresses and fulfills the needs identified above. It does so by providing a dispensing device construction that facilitates wetting only a small fraction of the soluble solid halogen source within the device, so that only a small volume of halogen solution need be regulated for dispersement to a body of water. The dispensing device construction provides adjustable dispensing ports that, when combined with the controlled production of the halogen solution, allow precise control of the dispersement rate of the halogen solution to the body of water. Additionally, the dispensing device is constructed having a removable cap at the top of the device making reloading of the solid halogen source more convenient.

Generally speaking, in terms of structure the dispensing device comprises a body having a source chamber sized to accommodate a volume of solid halogen source therein, wherein the chamber comprises an open upper end and a lower closed end. The body comprises a number of apertures near the closed end that are positioned at diametrically opposed locations. The apertures facilitate water passage into the chamber and halogen solution passage from the chamber to the water.

A control member, comprising an open end and a closed end separated by a cylindrical wall, is rotatably attached about its open end to the closed end of the chamber. The control member comprises openings that extend through the wall and are positioned at diametrically opposed locations that correspond to the position of the apertures. The alignment of each opening with respective apertures by the rotation of the control member relative the body forms dispensing ports. The body further comprises an indicator on the outside surface alignable with graduation marks along the wall of the control member to provide an indication of the degree of port closure.

A cap is releasably attached to the open end of the body to form an air and water-tight seal therebetween. The formation of an air and water-tight seal ensures the formation of an air head or air pocket within the body. The air head is important because it defines the water level within the body and, thus the degree of solid halogen wetting. A float cavity is disposed around the outside surface of the body and comprises a volume of foam material therein to ensure that the device has a predetermined degree of buoyancy. A weight is contained within the control member to ensure that the device has a predetermined degree of ballast. Together, the float cavity and the weight cause the device to float erect, irrespective of the amount of solid halogen source in the body.

When placed in the water, the water is allowed to circulate through the apertures, wetting the solid halogen source and generating halogen solution that is dispensed via the ports to the body of water. The device facilitates precise control of the halogen solution to the surrounding water due to controlled solid halogen wetting and variably adjustable dispensing ports.

BRIEF DESCRIPTION OF THE DRAWINGS

The above-mentioned and other features of this invention are set forth in the following detailed description of the presently preferred and other embodiments of the invention which description is presented with reference to the accompanying drawings wherein:

FIG. 4 is a side elevational view of the dispensing device of FIGS. 1–3 in a disassembled state.

DETAILED DESCRIPTION

Figure 1:
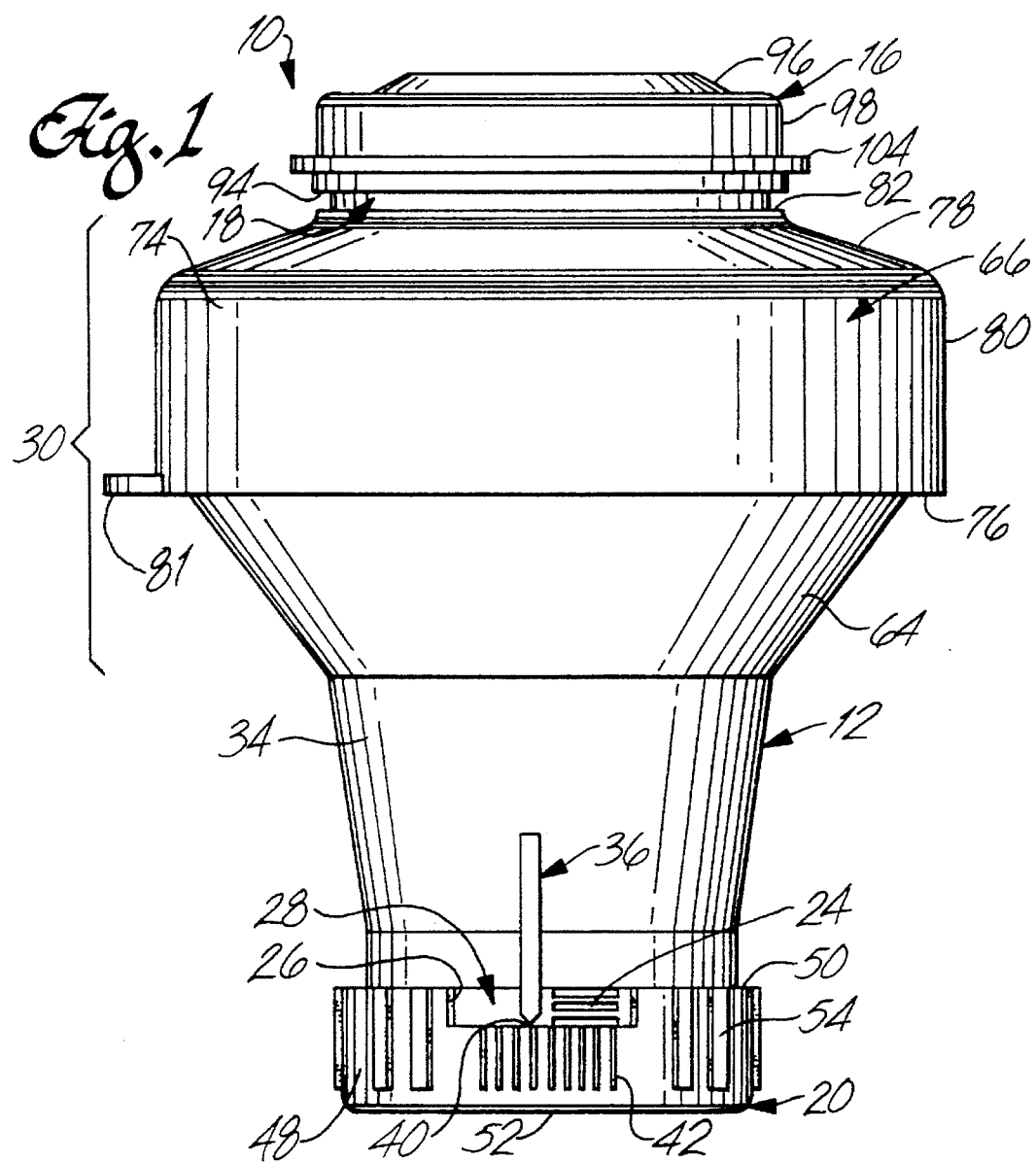
FIG. 1 is a side elevational view of an assembled dispensing device as provided in the practice of this invention.
Figure 2:
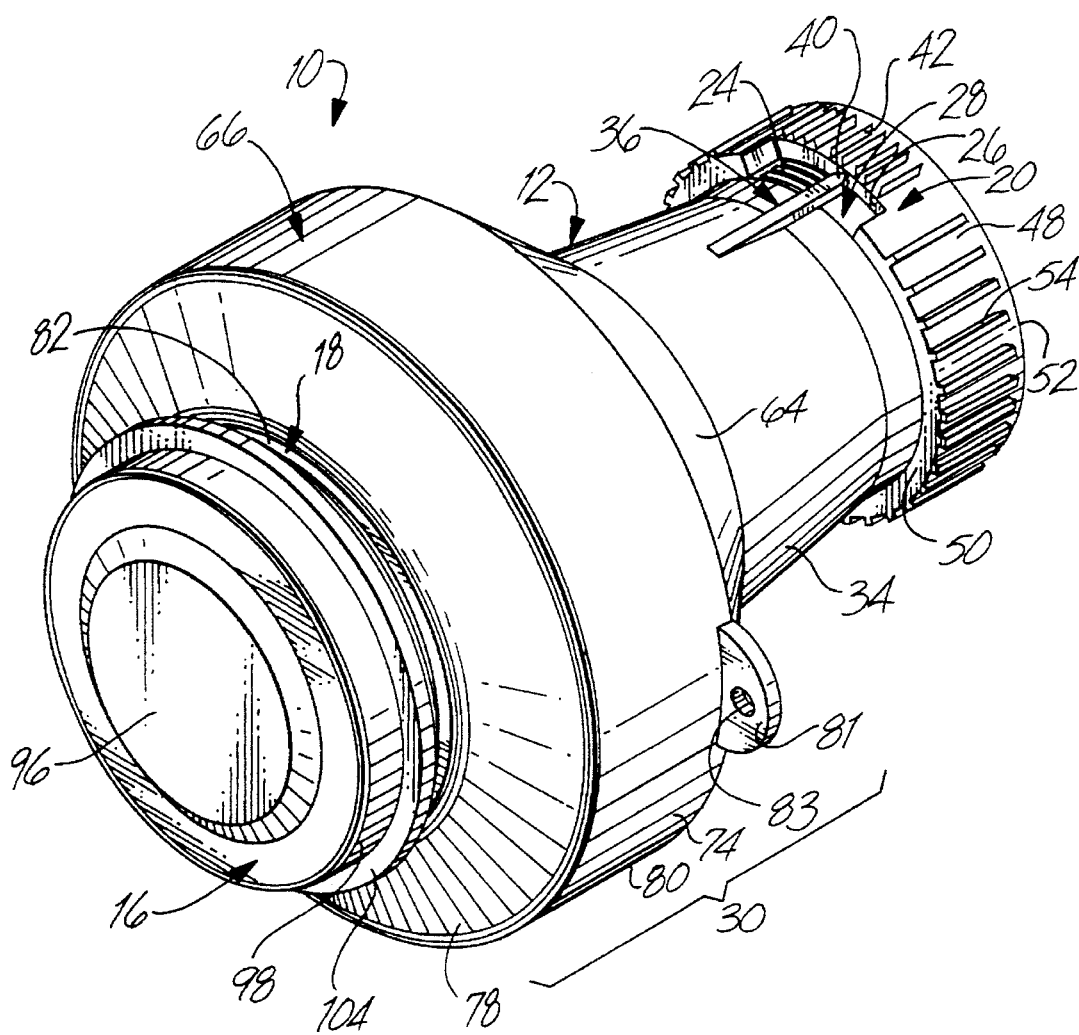
FIG. 2 is a perspective drawing of the assembled dispensing device shown in FIG. 1.

FIGS. 1–4 show a presently preferred embodiment of a dispensing device 10 constructed according to principles of this invention for dispensing a solution derived from a solid halogen source or the like into a body of water. Referring particularly to FIGS. 1 and 2, the dispensing device 10 comprises a body 12 including a chamber 14 for accommodating a volume of solid soluble halogen source therein. A cap 16 is disposed at an open end 18 at the top of the chamber to form an air and water-tight seal with the chamber. A control member 20 is rotatably disposed at a closed end 22 at the bottom of the chamber. The body 12 comprises a number of apertures 24 near the closed end 22 that are aligned with openings 26 in the control member 20 to form a port 26 that controls the rate of halogen solution dispersement into a body of water. The rate of halogen solution dispersement is adjusted by rotating the control member about the body, thereby opening or closing the size of the port 28 via alignment of respective apertures 24 and openings 26. A float cavity 30 provides buoyancy to the device and a ballast 32 ensures that the device floats in a stable attitude when placed into a body of water.

For purposes of reference, the dispensing device illustrated in FIGS. 1–4 is positioned in a vertical orientation with the cap 16 located at the physical top of the device and the control member 20 located at the physical bottom of the device. It is, therefore, understood that the description of this device is with reference to the orientation as specifically described above.

Figure 3:
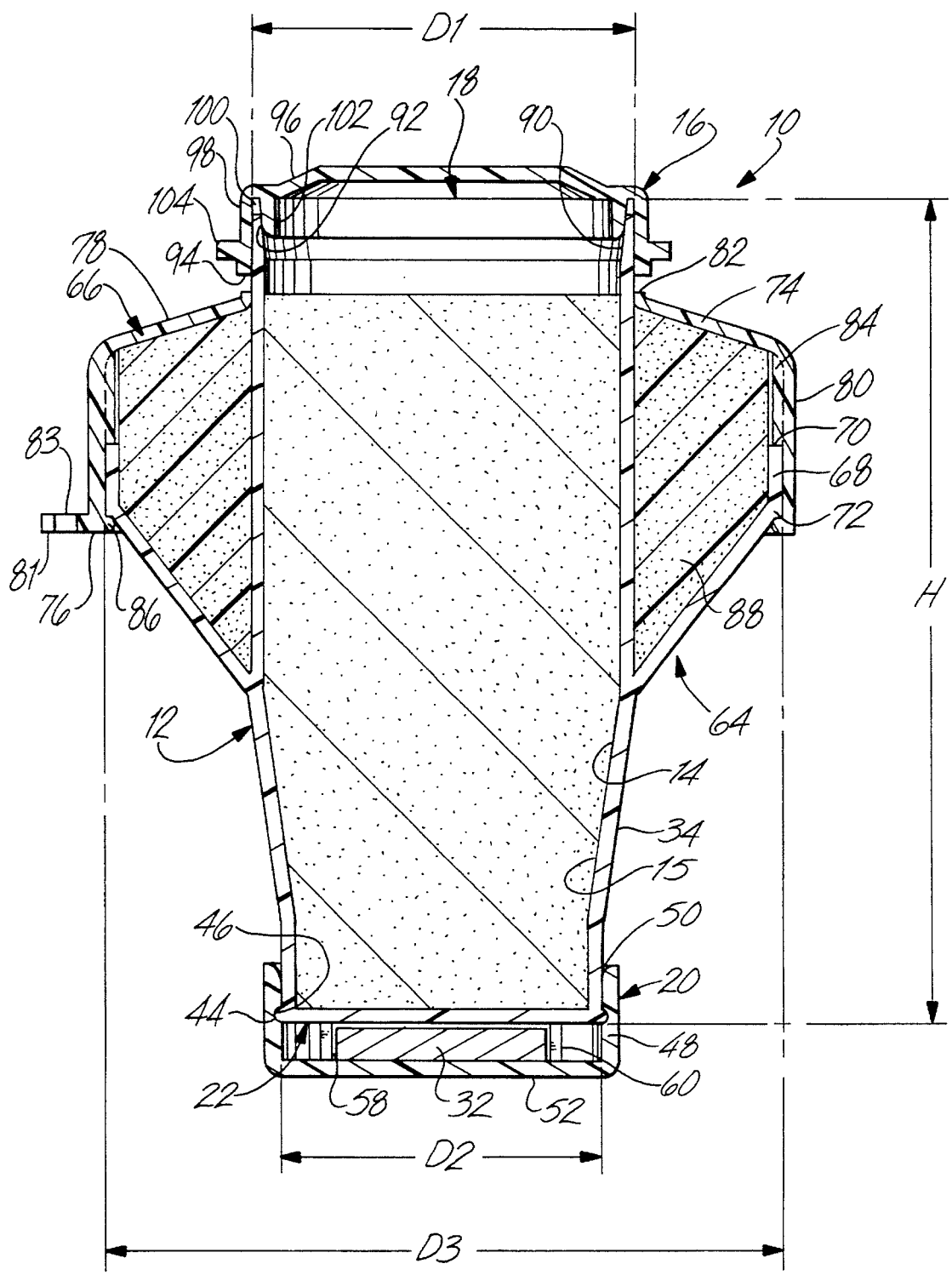
FIG. 3 is a vertical cross-sectional view of the assembled dispensing device shown in FIGS. 1 and 2.

The body 12 has a generally cylindrical configuration comprising a tapered portion 34 that extends from near a middle portion of the body adjacent a bottom portion of the float cavity 30 to the closed end 22 of the chamber. The tapered portion facilitates the gravity passage of the solid halogen source downwardly through the chamber 14 to the closed end 22, and also facilitates the manufacture of the body by conventional mold process. In a preferred embodiment, the body 12 has a height H of approximately 140 millimeters (5.5 inches), an outside diameter D1 at the open end 16 of approximately 66 millimeters (2.6 inches), an outside diameter D2 at the closed end 20 of approximately 56 millimeters (2.2 inches), and a wall thickness of approximately 2 millimeters (0.08 inches), as shown in FIG. 3.

The body 12 comprises a plurality of apertures 24 that extend through the body wall. In a preferred embodiment, the apertures are configured in the shape of horizontal slots. The slots 24 are arranged in columns that are positioned adjacent to the closed end 22 of the chamber at diametrically opposed locations of the body. In a preferred embodiment, the device comprises approximately six horizontal slots, arranged in two adjacent columns of three horizontal slots each positioned at each diametrically opposed side of the body. Each slot is rectangular in configuration, having a vertical opening size of approximately 1 millimeters (0.04 inches), and a horizontal opening length of approximately 25.4 millimeters (1 inch). Each column of horizontal slots is separated from an adjacent column by approximately 1.5 millimeters (0.06 inches).

The size and configuration of the apertures 24 are selected to provide a high degree of control over halogen solution dispersement by alignment with a adjacent openings 26 in the control member 20 to form dispersement ports 28. The location of the openings 26 vis-a-vis the apertures 24 can be selectively adjusted to vary the size of the dispersement port 28 and, thereby provide a high degree of control over the dispersement rate of the halogen solution to the water. The size of the apertures or slots 24 is also selected to act as screen to prevent the passage of solid halogen particles into the water. The passage of such solid halogen particles from the device is not desired because of the damaging effect or harm that such particles of highly concentrated oxidizing source may have on pool components, e.g., fading or discoloring pool covers, spa covers, or vinyl pool siding, or swimmers.

Referring to FIGS. 1, 2 and 4, the body 12 comprises a pair of dispersement port indicators 36 integral with an outside surface of the body 12 that each extend in a vertical manner along the body, parallel with an axis of the body, from a position near the closed end 22 upwardly near the middle of the body. Each port indicator 36 is positioned at diametrically opposed locations on the body, i.e., 180 degrees apart, adjacent to the openings 26. In a preferred embodiment, each port indicator is located adjacent a column of slots 24. In a preferred embodiment, each port indicator has a thickness of approximately 2.5 millimeters (0.1 inches), a length of approximately 25.4 millimeters (1 inch), and a distance from a column of slots of approximately 1 millimeter (0.04 inch). Each port indicator comprises a pointed end portion 40 directed toward the closed end 22 of the chamber 14 that aligns with graduation marks 42 disposed on the control member 20. The alignment of the port indicator with a particular graduation mark provides a particularly sized dispersement due to the alignment of the apertures 24 with the openings 26, as best shown in FIGS. 1 and 2.

Referring to FIGS. 3 and 4, the body 12 comprises a tongue 44 that extends radially outward from the body a predetermined distance and is positioned circumferentially around the body 12 at the closed end 22. In a preferred embodiment, the tongue 44 extends away from the body a distance of approximately 0.8 millimeters (0.03 inches). As shown in FIG. 3, the tongue 44 cooperates with a complementary groove 46 in the control member 20 that extends circumferentially around an inside surface of a wall portion 48 of the control member 20. The tongue and groove arrangement provide a releasably locking fit between the control member and body by placement of the control member over the closed end. The tongue and groove arrangement also facilitates slidable rotation of the control member about the body to accommodate adjustment of the dispersement port size. The groove 46 is located a around the wall portion a predetermined distance from an open end 50 of the control member. In a preferred embodiment, the groove 46 is positioned approximately 10 millimeters (0.4 inches) from the open end 50. It is preferred that the cooperating tongue and groove members be configured having rounded surfaces to facilitate releasable locking interaction.

The control member 20 comprises a closed end 52 opposite to the open end 50, wherein the open and closed ends are separated by the wall portion 48. As shown in FIGS. 1 and 3, the openings 26 are located at diametrically opposed positions of the wall portion 48. In a preferred embodiment, the openings are configured in the shape of a rectangle. Each horizontal opening 26 extends vertically from the open end 50 of the control member a predetermined distance and extends horizontally around the circumference of the control member wall 48 a predetermined distance to form a rectangle oriented with a length dimension in the horizontal position. In a preferred embodiment, the wall portion 48 has a thickness of approximately of 2 millimeters (0.08 inches) and each horizontal opening 26 has a dimension of approximately 6.4 millimeters (¼ inch) by 25.4 millimeters (1 inch). Each horizontal opening 26 is configured and positioned to complement the arrangement of horizontal slots 24 in the body so that when the control member is rotated into a "full open" position, each horizontal opening is aligned with all of the respective horizontal slots to provide a maximum dispersement port size and, thereby provide a maximum dispersement rate of halogen solution to the surrounding water.

The control member 20 comprises a number of integral graduation marks 42 positioned vertically along the axis of the wall portion 48, extending downwardly from each horizontal opening 26 to the closed end 52 of the control member. In a preferred embodiment, the control member comprises approximately nine graduation marks. When the control member 20 is attached over the closed end of the body 12 the graduation marks 42 align with an adjacent port indicator 36 to provide a visual indication of the size of the port size. By using the alignment of the indicator with a particular graduation mark a user is able to adjust the device to provide a desired rate of halogen solution dispersement into the water. For example, when the control member is rotatably positioned with the pointed end 40 of the port indicator 36 aligned with the furthest graduation mark to the right (referring to FIG. 1), the dispersement port at each diametrically opposed position of the body will be closed and no halogen solution will be dispensed. When the control member is rotatably positioned with the pointed end 40 of the port indicator 36 aligned with the furthest graduation mark to the left (referring to FIG. 1), the dispersement ports 28 will be opened to the largest degree and a maximum rate of halogen solution is dispensed to the water. Accordingly, to increase the rate of halogen solution dispersement a user rotates the control member 20 clockwise around the body 12 (when viewed from the closed end 42 of the control member), and would rotate the control member counterclockwise to decrease the rate of halogen solution dispersement.

Referring again to FIGS. 1, 2 and 4, the control member 20 comprises a number of gripping ridges 54 that are integral with an outside surface of the wall 48 that each extend in a vertical manner parallel with the axis of the wall from the open end 50 to a position near the closed end 52. The gripping ridges are positioned between the horizontal openings 26 and provide a gripable outer surface for purposes of allowing a user to easily grip and rotate the control member 20 about the body 12. In a preferred embodiment, the control member comprises approximately 20 gripping ridges 54 that are spaced apart at equidistant intervals of approximately 10 degrees.

Referring to FIG. 3, the control member 24 comprises a weight cavity 58 formed by an inside wall 60 that extends from an inside surface of the closed end 52 and is concentrically position within the wall portion 48. The weight cavity 58 serves to accommodate a weight 32 therein to serve as a ballast for the dispensing device to ensure that the device maintain an upright vertically disposed position while floating in the water. The weight may be formed from a metal material, such as lead and the like. In a preferred embodiment, the weight cavity 58 has an inside wall diameter of approximately 38 millimeters (1.5 inches) and an inside wall height of approximately 6.4 millimeters (¼ inch). Accordingly, the size of the weight 32 used in a preferred embodiment is defined by the dimension of the weight cavity.

Referring to FIGS. 1–4, the device comprises a float cavity 30 disposed circumferentially around the body 12. The float cavity is defined by the body 12 along an inside surface, a float wall 64 along a bottom and outside surface, and a float cover 66 along a top and outside surface. The float wall 64 extends in an angular direction outwardly away from the body and the closed end 22. As best shown in FIGS. 3 and 4, the float wall 64 extends outwardly away from the body toward the open end 18 in an angular manner for a predetermined distance and includes a non-angularly extending or concentric portion 68 near an open end 70 of the float wall. The concentric portion 68 is concentric with the body 12 and includes a notch 72 that extends circumferentially about the float wall adjacent the angular portion for purposes of accommodating attachment of the float cover 66. In a preferred embodiment, the float wall 64 extends from the body 12 at an angle of approximately 45 degrees, the angular portion has a vertical measurement parallel with the body of approximately 30.5 millimeters (1.2 inches), and the concentric portion 68 has a vertical measurement of approximately 12.7 millimeters (½ inch) and an inside diameter of approximately 117 millimeters (4.6 inches).

The float cover 66 includes an annular housing 74 having a generally cylindrical configuration. The housing has an open end 76 having an inside diameter sized to fit over the outside surface of the concentric portion 68 of the float wall 64. A partially closed end 78 is positioned opposite to the open end 76 and is separated from the open end by a cylindrical cover wall 80. The cylindrical cover wall 80 comprises an integral tab 81 that is positioned near the open end 76 and extends horizontally outward a predetermined distance away from the wall 80. The tab may be configured having a semi-circular shape or and like and includes an opening 83 to accommodate a tether attachment with another dispensing device, with another pool device, or with the side of the pool or spa to maintain a fixed dispenser location. In a preferred embodiment, the tab has a semicircular configuration with a radial dimension of approximately 7.6 millimeters (0.3 inches).

The partially closed float cover end 78 comprises an opening 82 sized and configured to accommodate the passage of the body 12 therethrough, thereby permitting the placement of the float cover 66 over the body and the placement of the open end 76 over the float wall 64. In a preferred embodiment, the float cover comprises an open end 76 having an inside diameter D3 of approximately 114 millimeters (4.5 inches), a cover wall 80 having a vertical height of approximately 25.4 millimeters (1 inch), and an opening 82 in the partially closed end 78 having a diameter D1 of approximately 66 millimeters (2.6 inches), as shown in FIG. 3.

As best shown in FIG. 3, the float cover comprises a plurality of seating ridges 84 positioned axially within the inside surface of the cover wall 80 and extending inwardly from the wall surface towards an axis of the float cover a predetermined distance. The seating ridges 84 extend vertically from a position adjacent the partially closed end 78 toward the open end 76 and to a position midway along the cover wall 80. In a preferred embodiment, the float cover comprises approximately eight seating ridges, each arranged at equidistant positions at approximately 45 degree intervals as measured from the axis of the cover wall. Each seating ridge extends away from the cover wall a distance of approximately 2 millimeters (0.08 inches), and has a length of approximately 12.7 millimeters (0.5 inches). The seating ridges serve to provide a seating surface for placement of the open end 70 of the float wall thereon, thereby limiting the extent to which the float cover 66 is installed over the float wall by interaction of the seating ridges 84 against the terminal surface of the open end 70, as shown in FIG. 3.

Referring again to FIG. 3, the float cover 66 includes a locking ridge 86 that is positioned circumferentially around the inside surface of the cover wall 80 at the open end 76, and extends inwardly a predetermined distance towards the axis of the cover wall. The locking ridge 86 serves to provide a releasable locking attachment with the float wall 64 when installed over the float wall by interaction of the locking ridge 86 over the notch 72. Accordingly, locking interaction between the float wall 64 and float cover 66 is achieved by lowering the float cover over both the body 12 and over the open end 70 of the float wall 64, causing the locking ridge 86 to slide over the concentric portion 68 of the float wall and past the notch 86. In a preferred embodiment, the locking ridge 86 extends from the surface of the float wall a distance of approximately 0.8 millimeters (0.03 inches) and has a rounded configuration to accommodate releasable engagement with the float wall by pulling the two apart.

Referring to FIGS. 3 and 4, the float cavity 30, formed by the assembled float wall 64 and float cover 66, includes a volume of foam material 88 to ensure that the device has positive buoyancy and will not sink when placed in the water. Closed-cell foam rather than sponge-like foam is a preferred filling. The foam-filled float cavity 30 and ballasted control member 20 cooperate to ensure that the device remains vertically disposed in the water at the desired water level, irrespective of the presence or absence solid halogen source. The device thus has a spar-type geometry. If the device was not ballasted, it could float horizontally, and the access of water to the halogen source adjacent to the horizontal slots 22 could not be precisely controlled by bobbing action and the like that would pump water through the device.

Referring to FIG. 3, the open end 18 of the chamber 14 comprises a tapered surface 90 that extends circumferentially around the inside surface of the open end 18. The tapered surface facilitates a locking air and water-tight attachment with a complementary tapered portion 92 of the cap 16. In a preferred embodiment, the amount of taper is approximately five degrees with respect to the axis of the body 12, and the vertical length of the tapered surface is approximately 7.7 millimeters (0.3 inches).

Referring to FIGS. 1, 3 and 4, the cap 16 comprises an open end 94 and a closed end 96 that are separated by a cylindrical wall 98. The open end 94 is sized to accommodate placement of the cap over the open end 18 of the chamber 14. In a preferred embodiment, the open end 94 has an inside diameter of approximately 66 millimeters (2.6 inches). A groove 100 is formed between the inside surface of the wall 98 and an inside wall 102 positioned concentrically within the cylindrical wall 98 and which extends vertically in downward manner a predetermined distance from the closed end 96. The inside wall comprises the tapered portion 92 directed toward the inside surface of the wall 98. In a preferred embodiment, the tapered portion 92 has a taper angle that complements the tapered surface 90 of the open end 18 of the chamber 14. The inside wall 102 has an inside diameter of approximately 58 millimeters (2.3 inches) and extends approximately 6.4 millimeters (¼ inches) from the closed end 96 of the cap 18. The cap 16 is installed onto the body by lowering the open end 94 of the cap over the open end 18 of the chamber 14, causing the tapered surface 90 of the open end 18 to engage taper portion 92 of the inside wall 102 and be engaged within the groove 100. The engagement of the open end 18 within the groove 102 forms an air and water-tight seal between the cap and body.

Referring to FIGS. 1–4, the cap 16 includes a gripper ring 104 positioned near the open end 94 and extends horizontally outward a predetermined distance away from the wall 98. The gripper ring 104 extends around the entire circumference of the wall 98 and serves to provide a grippable surface to facilitate removing the cap from the body by a user.

The engagement of the open end 18 of the chamber 14 within the groove 100 of the cap 16 forms an air and water-tight seal therebetween. The formation of an air and water-tight seal at the open end 18 of the chamber 14 is important because it serves to provide an air head or air pocket within the chamber 14 of constant volume. The formation and preservation of the air head within the chamber controls the amount of solid halogen source within the chamber that is wetted, or exposed to water circulating through the ports 28, openings 26 in the control member 20, and apertures 24 about the closed end 22 of the chamber 14. It is important that only a controlled amount of the solid halogen source be wetted for purposes of providing a high degree of control over the dispersement rate of the halogen solution. This is so because it is difficult to control the dispersement rate of a liquid purely by adjusting the size of the dispersement port. A better method is to control both the size of the dispersement port and the rate at which the liquid is produced, so that at any given time there is little or no pressure head of solution within the chamber. Any such pressure head of solution within the chamber aggravates the ability to obtain good dispersement control by port size adjustment by making such dispersement rate extremely sensitive to minute adjustments in port size. It is preferred that the air head formed within the chamber extend within from the cap to the top most aperture 24, so that the only portion of solid halogen source that is subjected to exposure with water circulated through the body is that portion of halogen source positioned adjacent to the apertures.

Referring to FIGS. 3 and 4, the dispensing device is assembled and prepared for use by installing the foam material 88 into the float cavity 30, and placing the float cover 66 over the body 12 and float wall 64 until the seating ridges 84 are seated against the open end 70 of the float wall 64 and the locking ridge 86 is locked into position over the notch 72. The ballast weight 32 placed into the weight cavity 58 of the control member 20 and the control member is rotatably mounted onto the closed end 22 of the chamber 14 by engagement of the tongue portion 44 of the closed end with the groove 46 of the control member. The body chamber 14 is loaded with the desired solid halogen source by pouring the source into the open end 18 until the desired level is achieved. The preferred solid halogen source level is just below the tapered surface 90 of the open end 18 so as to not interfere with the sealing engagement of the cap 16 thereon.

The cap 16 is attached to the open end 18 of the chamber 14 to provide an air and water-tight seal. The control member 20 is rotatably adjusted vis-a-vis the body so that a desired port 28 size is obtained by alignment of the openings 26 with the apertures 24. Once the user has obtained a desired port size and a desired halogen solution dispersement rate the user can note the alignment of each port indicator 36 with a particular graduation mark 42. If the user desires to later change the setting the user can refer to the port indicator and rotate the control member to effect alignment with a new graduation mark, thereby adjusting the size of each port and the dispersement rate of halogen solution.

The device is lowered into the water and assumes an upright vertical position with the cap 16 oriented a distance above the surface of the water and the control member 20 completely immersed. The water flows into the body chamber 14 via the apertures 24 at one location, to wet the solid halogen source positioned adjacent the closed end 22 of the chamber next to the apertures, thereby forming halogen solution. The halogen solution formed within the chamber is allowed to flow out of the chamber via circulation through the apertures at an opposite location and into the body of water.

The use of an air-tight body to provide a constant air head within the body, limiting the amount of solid halogen source that is wetted, together with the openings 26 and apertures 24 that form adjustable ports 28, provides precise control over halogen solution dispersement not previously obtainable by known dispensing devices. For example, known dispensing devices typically wet the entire or a large amount of the solid halogen source within the dispenser and rely on the gross adjustment of relatively large openings within the device to control the rate of solution dispersement to the surrounding water. These devices are unable to reliably provide a precise method of controlling the dispersement of halogen because the use of adjustable openings to control the dispersement of a large volume of concentrated halogen is very touchy and not capable of being well metered. Additionally, the use of such known dispensing devices results in rapid solid halogen source exhaustion, frequent solid halogen loading, and thus increased operating expenses and user attention.

The dispensing device constructed according to this invention combines the use of limited solid halogen source wetting and variable port adjustment to both control the amount of halogen wetted and to provide precise control of the amount of halogen solution dispensed to the water. Accordingly, the use of this device results in solid halogen usage optimization, increased solid halogen loading intervals, and thus decreased operating expenses and reduced user attention.

It is to be understood that the dispensing device as constructed according to principles of this invention is meant to accommodate a variety of different types of soluble solid halogen sources such as chlorine, bromine and the like. A preferred halogen source is chlorine. It is also to be understood that the dispensing device can accommodate soluble halogen sources made by a variety of different manufacturers in a variety of different configurations such as sticks, tablets and the like.

The dispensing device can be manufactured using conventional molding techniques and conventional materials. In a preferred embodiment, the body 12, float cover 66, and control member 20 are injection molded of a rigid high-density polyethylene material. However, other injection-moldable resins such as polypropylene or vinyl may also be suitable. The cap 16 is injection molded of a flexible low-density polyethylene material to facilitate flexible movement of the cap to accommodate attachment with the body and to provide and air and water-tight seal therebetween. Polyethylene is quite chemically-resistant and thus resists cracking degradation due to prolonged exposure to sunlight and chlorinated water. Manufacturing processes other than injection molding may be used to construct the dispenser.

Workers skilled in the art to which the invention pertains will recognize that the foregoing description, presented with reference to the presently preferred embodiment of the invention, is illustrative and not exhaustive of all forms which device embodying the invention may take. Thus, the following claims are to be construed broadly and interpreted consistent with the illustrative nature of the preceding description.

What is claimed is:

1. A reusable floating device for dispensing a solution derived from a solid into a body of water, the device comprising:

a body for accommodating a volume of the solid in a chamber, wherein the chamber has an open upper end and a closed lower end;

at least one aperture through the body from the chamber;

a control member mounted on the body and having at least one opening located at a position corresponding to the aperture, the relative alignment of the opening and the aperture defining the size of a port for dispensing the solution from the chamber to the exterior of the body, the degree of closure of the port being variable from fully closed to fully open depending on the location of the control member on the body; and a cap releasably connectible to the open end of the chamber for providing an air-tight seal between the cap and body.

2. The reusable dispensing device as recited in claim 1 wherein the body comprises apertures located at diametrically opposed locations, wherein each aperture comprises a rectangular shaped opening oriented with a length dimension positioned perpendicular to an axis along the body.

3. The reusable dispensing device as recited in claim 2 wherein the apertures are arranged in two adjacent columns of three apertures per column at each diametrically opposed location, the columns being arranged perpendicular to the axis along the body.

4. The reusable dispensing device as recited in claim 1 wherein the control member comprises two openings located at diametrically opposed positions, each opening having a rectangular configuration with a length dimension oriented perpendicular to an axis along the control member, wherein each opening is positioned adjacent to apertures in the body, thereby forming two diametrically opposed ports.

5. The reusable dispensing device as recited in claim 1 wherein the control member comprises a ballast weight attached to a closed end of the control member.

6. The reusable dispensing device as recited in claim 1 wherein the body comprises an integral port indicator projected outwardly a predetermined distance away from an outside surface of the body and extending along the axis of the body a predetermined distance adjacent the closed end of the chamber.

7. The reusable dispensing device as recited in claim 6 wherein the control member comprises a number of graduation marks located along a cylindrical wall, the graduation marks being positioned at predetermined intervals and extending along an axis of the control member, wherein alignment of the port indicator with a graduation mark provides an indication of the degree of closure of each port.

8. The reusable dispensing device as recited in claim 1 wherein the device comprises a float cavity extending circumferentially around the body between a middle portion and the open end of the of the chamber, the float cavity accommodating a volume of foam material therein to provide buoyancy.

9. A device for producing halogen solution from a soluble solid halogen source and dispensing the solution in a controlled manner to a body of water, the device comprising:

a body defining a source chamber comprising an open end at one end and a closed end at an opposite end;

a number of apertures extending through the body and into the chamber housing, wherein the apertures are positioned near the closed end of the chamber;

a cap releasably attached to the open end to form an air-tight seal therebetween; and a control member comprising an open end and a closed end separated by a cylindrical wall extending therebetween, the open end of the control member being rotatably attached to the closed end of the chamber, the control member having openings in the wall at locations that correspond to the locations of the apertures, forming dispensement ports by alignment of each opening with respective apertures.

10. A device as recited in claim 9 wherein the apertures are positioned at diametrically opposed locations in the body and each location comprises more than one aperture.

11. A device as recited in claim 10 wherein the openings in the control member are positioned at diametrically opposed locations that correspond to the location of the apertures, wherein each opening is configured to accommodate the total number of apertures at each location to form a dispensement port at each location.

12. A device as recited in claim 9 wherein the water level in the chamber when the device is placed into the water remains constant and is defined by the location of the apertures that are located furthest from the closed end of the chamber.

13. A floating device for producing a halogen solution from a solid soluble halogen source and dispensing the solution into a body of water at a controlled rate, the floating device comprising:

a cylindrical body having a chamber for accommodating a volume of solid soluble halogen source therein, the chamber having one open end and one closed end;

a number of apertures slots disposed through the body adjacent the closed end, wherein the apertures are positioned at diametrically opposed locations of the body;

a control member rotatably mounted to the closed end of the chamber, the control member having a cylindrical wall interposed between a closed end and an open end, the wall comprising openings positioned at diametrically opposed locations that correspond to the location of the apertures; and a cap attached to the open end of the chamber forming an air and water-tight seal therebetween.

14. The floating device as recited in claim 13 wherein the apertures are configured in the shape of slots having a rectangular configuration oriented with a length dimension positioned perpendicular to an axis along the body, wherein the apertures are arranged in at least one column.

15. The floating device as recited in claim 14 wherein the openings in the control member are each configured in the shape of a rectangle oriented with a length dimension perpendicular to the axis along the cylindrical wall, each opening being positioned near the open end of the control member.

16. The floating device as recited in claim 15 wherein the alignment of each control member opening with respective apertures forms dispensement ports at diametrically opposed locations of the device for dispersing halogen solution into the body of water.

17. The floating device as recited in claim 15 comprising a float cavity positioned near a middle portion of the device for enclosing a volume of foam material therein, the float cavity being defined at an inner surface by the body, at an outer surface and bottom by a float wall integral with the body and larger in diameter than the housing, and at an outer surface and top by a float cover that is releasably attached to the float wall.

18. The floating device as recited in claim 17 wherein the control member comprises a ballast in the form of a weight inserted into a weight cavity formed at the closed end of the control member, the float cavity and ballast causing the device to float erect with the closed end of the chamber down, irrespective of the presence or absence of a solid halogen source.

19. The floating device as recited in claim 13 comprising an indicator integral with the body configured to communicate with graduation marks integral with the wall of the control member for indicating the position of the control member on the body.

20. A device for producing halogen solution from a soluble solid halogen source and dispensing the solution in a controlled manner to a body of water, the device comprising:

a body including a source chamber for accommodating a volume of soluble solid halogen source therein, wherein the chamber comprises an open end at one end and a closed end at an opposite end;

a number of apertures extending through the body and into the chamber near the closed end for accommodating water passage into the chamber to wet the solid halogen source and for facilitating halogen solution passage from the chamber to the water;

a control member having an open end and a closed end separated by a wall extending therebetween, the open end of the control member being rotatably mounted to the closed end of the chamber, the control member having openings in the wall positioned at diametrically opposed locations alignable with respective slots to form adjustable area dispensement ports at diametrically opposed locations of the device;

a cap releasably attached to the open end of the chamber to form an air and water-tight seal therebetween and facilitate loading of the solid halogen source; and a float cavity disposed around the outside surface of the housing comprising a volume of foam material therein to provide buoyancy, and a ballast contained within the control member to cause the device to float erect.

* * * * *

UNITED STATES PATENT AND TRADEMARK OFFICE
CERTIFICATE OF CORRECTION

PATENT NO. : 5,476,116
DATED : December 19, 1995
INVENTOR(S) : Kenneth E. Price & Michael L. Schuman It is certified that error appears in the above-indentified patent and that said Letters Patent is hereby corrected as shown below:

On the title page:

Item: [56] References Cited, U.S. PATENT DOCUMENTS, insert
-- 4,630,634  12/1986  Sasaki et al....137/268 --

Item: [56] References Cited, after "U.S. PATENT DOCUMENTS" insert

-- OTHER PUBLICATIONS
Brochure, *1989 POOL & SPA PRODUCTS*,
Rainbow Lifeguard, 1989, pp. 1-23 --

Signed and Sealed this

Twenty-first Day of May, 1996

Attest:

BRUCE LEHMAN

Attesting Officer    Commissioner of Patents and Trademarks